United States Patent
Tsai

(10) Patent No.: US 7,134,780 B2
(45) Date of Patent: Nov. 14, 2006

(54) FRAME INCLUDING STABLE CASE AND SLIDABLY MOVABLE CASE AND BACKLIGHT MODULE USING SAME

(75) Inventor: Kun-Jung Tsai, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 166 days.

(21) Appl. No.: 10/807,421

(22) Filed: Mar. 22, 2004

(65) Prior Publication Data

US 2004/0240195 A1   Dec. 2, 2004

(30) Foreign Application Priority Data

Mar. 21, 2003   (TW) ............................... 92204448 U

(51) Int. Cl.
*F21V 7/04* (2006.01)
(52) U.S. Cl. ....................... 362/633; 362/375; 362/632; 362/634; 349/58
(58) Field of Classification Search ................. 362/633, 362/362, 634, 632, 375; 312/331, 184; 349/58
See application file for complete search history.

(56) References Cited

U.S. PATENT DOCUMENTS

| 3,433,548 A | * | 3/1969 | Moore ........................ 312/184 |
| 3,544,187 A | * | 12/1970 | Hils ............................ 312/331 |
| 2002/0075667 A1 | * | 6/2002 | Kawashima et al. ........... 362/26 |
| 2004/0105251 A1 | * | 6/2004 | Yu et al. ....................... 362/31 |

FOREIGN PATENT DOCUMENTS

CN   1371018 A   9/2002

* cited by examiner

*Primary Examiner*—Sandra O'Shea
*Assistant Examiner*—James W Cranson, Jr.
(74) *Attorney, Agent, or Firm*—Wei Te Chung

(57) ABSTRACT

A frame for a backlight module includes a stable case (21), a movable case (22) and connecting elements. The stable case has a bottom plate (210) and at least three sidewalls (211) connected to the bottom plate, and the movable case has a back rim (221) and two side rims (222) connected thereto. The movable case is slideably connected with the stable case by the connecting elements. The frame is compact, and which can be used for light guide plates with different sizes.

17 Claims, 5 Drawing Sheets

FRAME INCLUDING STABLE CASE AND SLIDABLY MOVABLE CASE AND BACKLIGHT MODULE USING SAME

BACKGROUND OF THE INVENTION

1. Field of the Invention

The present invention relates to a frame and a backlight module using the same.

2. The Prior Art

In a liquid crystal display, a backlight module is always used to provide a planar light source for illuminating the liquid crystal display. In general, the backlight module includes a light source and a light guide plate, the light source being located adjacent to one side of the light guide plate. The light guide plate transfers light beams emitted from the light source to planar light beams, and directs them to a liquid crystal panel of the liquid crystal display.

A conventional backlight module 1, as shown in FIGS. 7 and 8, is described in China Pat. Pub. No. 1,371,018A which is published on Sep. 25, 2002. The backlight module 1 includes a light guide plate 10, a reflective plate 20, a light source cover 30, a light source 40 and a frame 50. Two protrusions 101 are disposed symmetrically at two sides of the light guide plate 20, respectively. The light source cover 30 has two connecting elements 301, and each of the connecting elements 301 has a mounting hole 302. The frame 50 includes two rims 501, and each of the rims 501 has two guiding troughs 503, 504 and a position area 502 for receiving and positioning the corresponding protrusion 101. Each rim 501 further includes a position hole 505. The light source cover 30 can be fixed with the frame 50 by the cooperation of the mounting holes 302, 505 and two screws 60.

A process is provided to assemble the backlight module 1, as shown in FIGS. 9 and 10. Firstly, the light guide plate 10 is inserted into the frame 50 at a tilt angle, so the protrusions 101 are placed in the corresponding guiding troughs 503, 504 and the position areas 502. Secondly, the light guide plate 10 is rotated slowly until the protrusions 101 are blocked and fixed in the corresponding position areas 502. The frame 50 can prevent the light guide plate 10 from shifting and loosing, so the damage of the light guide plate is eliminated.

Compactness is another important factor for the assembly. However, the above-mentioned assembly can't prevent light beams from leaking because the frame 50 is a fixed structure, which can't be adjusted to obtain a compact assembly. That is, intervals are introduced among the light guide plate 10, the light source 40 and the light source cover 30 due to the essentially tolerances thereof. Thus, a part of light beams emitted from the light source 40 can't be utilized, and the backlight module 1 is poor in brightness. The leaking light beams even lead to mura defects. Furthermore, the frame 50 does not fit in with practical conditions for the light guide plate 10 with different sizes.

An improved frame and a backlight module use the same that overcomes the above-mentioned disadvantages are desired.

SUMMARY OF THE INVENTION

An object of the present invention is to provide a frame which is compact, and which can be used for light guide plates with different sizes.

In order to achieve the object set forth, a frame for a backlight module in accordance with the present invention, comprises a stable case, a movable case and connecting elements. The stable case includes a bottom plate, at least three sidewalls connected to the bottom plate, and the movable case has a back rim and two side rims connected thereto. The movable case is slideably connected with the stable case by the connecting elements. The frame is compact, and which can be used for light guide plates with different sizes.

Other objects, advantages and novel features of the invention will become more apparent from the following detailed description when taken in conjunction with the accompanying drawings, in which:

DESCRIPTION OF THE PREFERRED EMBODIMENTS

Figure 1:
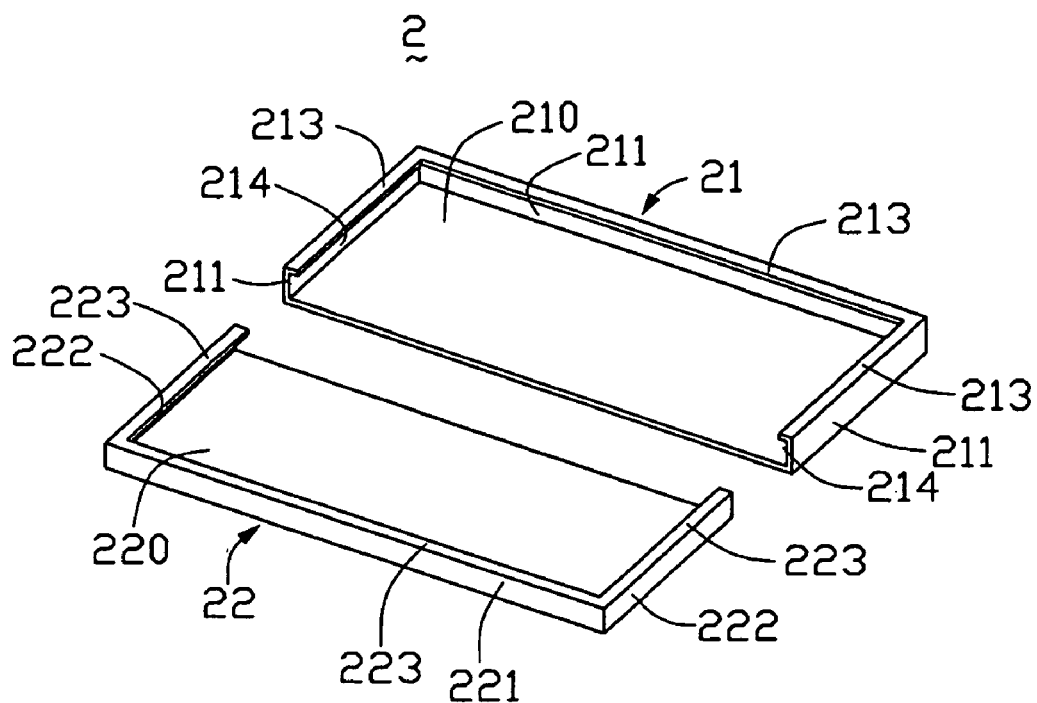
FIG. 1 is an exploded view of a first embodiment of a frame according to the present invention.
Figure 2:
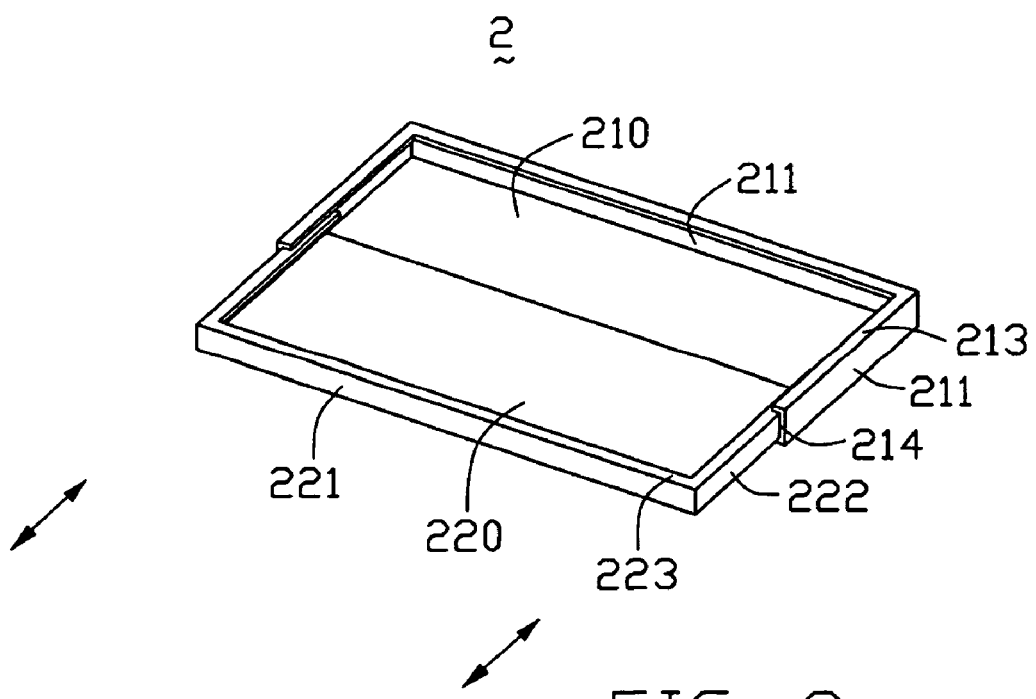
FIG. 2 is an assembly view of the frame in FIG. 1.

FIGS. 1 and 2 are views illustrating a first embodiment of a frame 2 according to the present invention. The frame 2 includes a stable case 21 and a movable case 22. The stable case 21 has a bottom plate 210, three sidewalls 211 protruded therefrom and interconnected with each other, and three flanges 213 projecting respectively from the sidewalls 211 and parallel to the bottom plate 210. The flanges 213, sidewalls 211 and the bottom plate 210 form two runners 214 opposite to each other. The movable case 22 has a bottom plate 220, a back rim 221, and two side rims 222, the two side rims 222 are connected to the bottom plate 220 and the back rim 221, respectively. Free ends (not labeled) of the back rim 221 and the side rims 222 are bent towards the inside of the frame 2, to define curve portions 223. Comparison with the stable case 21, the side rims 222 of the movable case 22 are slightly narrower than two parallel sidewalls 211 of the stable case 21, so the side rims 222 can be slideably inserted into the corresponding runners 214, that is, the movable case 22 can be accepted in the stable case 21 to form a space to receive a light guide plate or else elements, Furthermore, the movable case 22 can be inserted into and pulled out of the stable case 21 to adjust the space to receive a light guide plate with different sizes.

Surely, without the curve portions 223, the movable case also can get the functions of the movable case 22 described above, that is, the movable case can be slideably inserted into the stable case 21 too.

Figure 3:
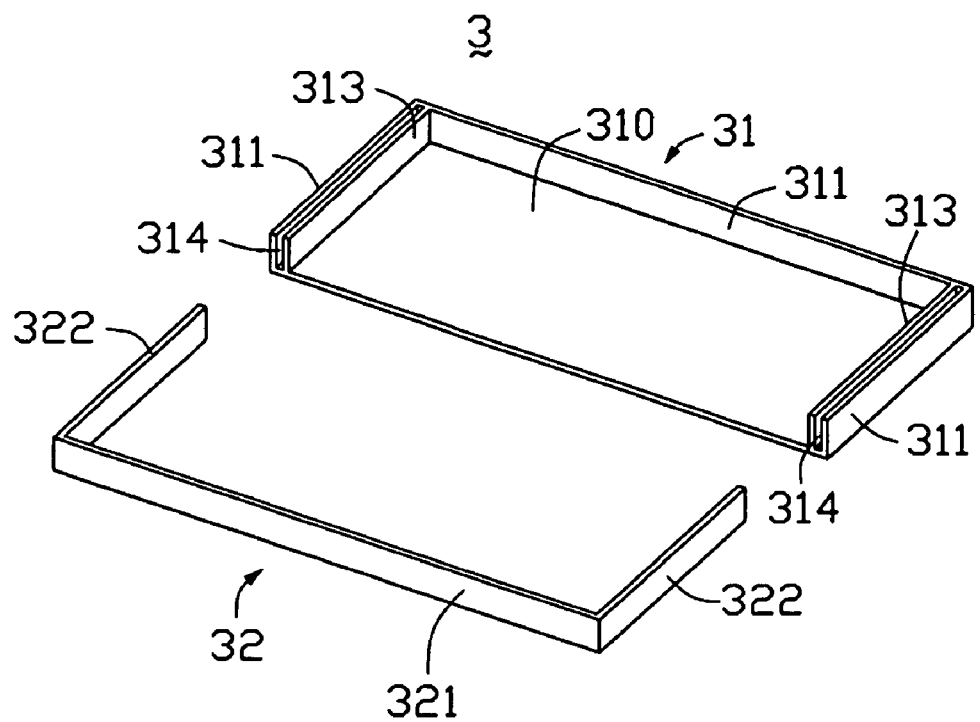
FIG. 3 an exploded view of a second embodiment of a frame according to the present invention.

FIG. 3 illustrates a second embodiment of a frame according to the present invention. The frame 3 includes a stable case 31 and a movable case 32. The stable case 31 has a bottom plate 310, three outside walls 311 protruded therefrom and interconnected with each other, and two inside walls 313 protruded from the bottom plate 310. The two inside walls 313 is located parallel to two of the outside walls 311, and the two inside walls and two outside walls parallel thereto form two sliding slot 314. The movable case 32 has a back rim 321 and two side rims 322 connected to the back rim 321 respectively. The side rim 322 is slightly narrower than the sliding slot 314, so the side rims 322 can be slideably inserted into the corresponding sliding slots 314 respectively, that is, the stable case 31 and the movable case 32 cooperatively form a space for receiving a light guide plate or else elements. The length of the bottom plate 310 can be extended along the side rims 312, 313 when the light guide plate with a different size is used.

Figure 4:
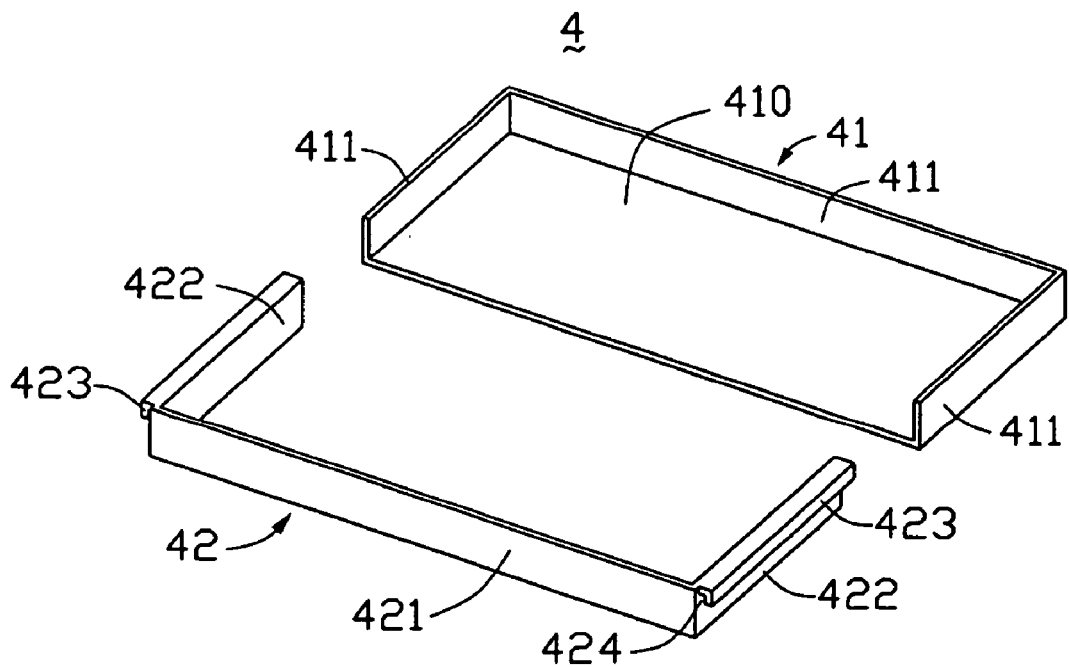
FIG. 4 an exploded view of a third embodiment of a frame according to the present invention.

FIG. 4 illustrates a third embodiment of a frame according to the present invention. The frame 4 has a stable case 41 and a movable case 42. The stable case 41 includes a bottom plate 410, and three sidewalls 411 protruded therefrom and interconnected with each other. The movable case 42 has a back rim 421 and two side rims 422 connected to the back rim 421. Each of the free ends (not labeled) of the side rims 422 is bent towards the outside of the movable case 42 to form a curve portion 423. The curve portion 423 and the corresponding side rim 422 cooperatively form a sliding slot 424 for receiving the corresponding sidewall 411 of the stable case 41. Comparison with the stable case 41, the height of side rim 422 is slightly higher than that of the sidewall 411, the distance between the two side rims 422 is less than that of the two parallel sidewalls 411, and the width of the sliding slot 424 is wider than that of the sidewall 411. Therefore, the sidewall 411 can be slideably inserted into the corresponding sliding slot 424.

Surely, the free ends of the side rims 422 can be bent in the same direction to form the curve portions 423 too. The curve portions 423 and the corresponding side rims 422 cooperatively define the sliding slots 424 to receive the corresponding sidewalls 411 of the stable case 41.

Figure 5:
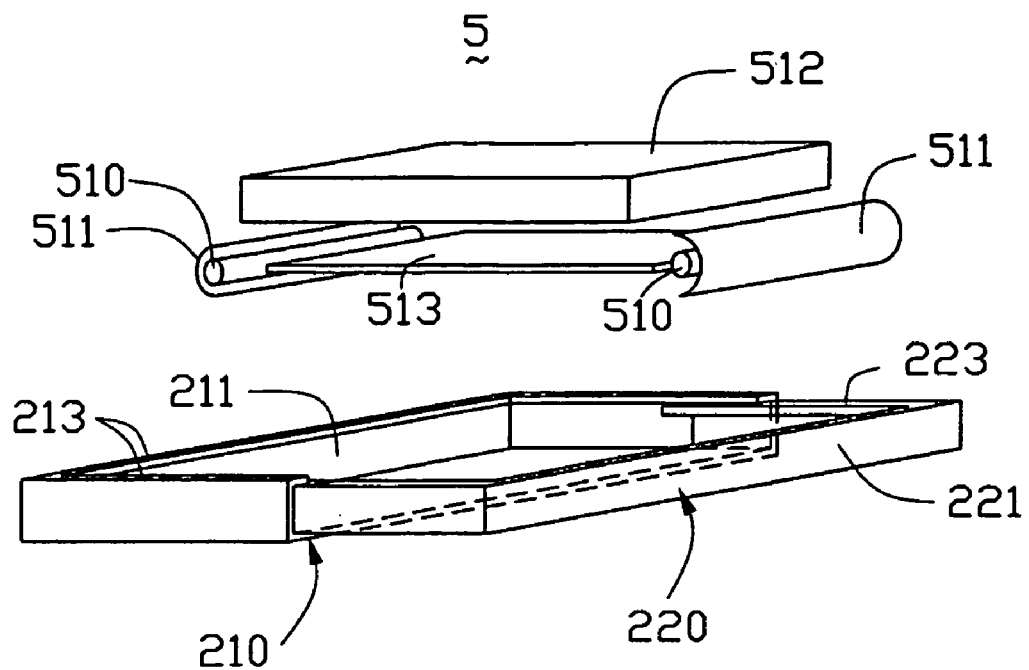
FIG. 5 is an exploded view of a backlight module using the frame of FIG. 1.
Figure 6:
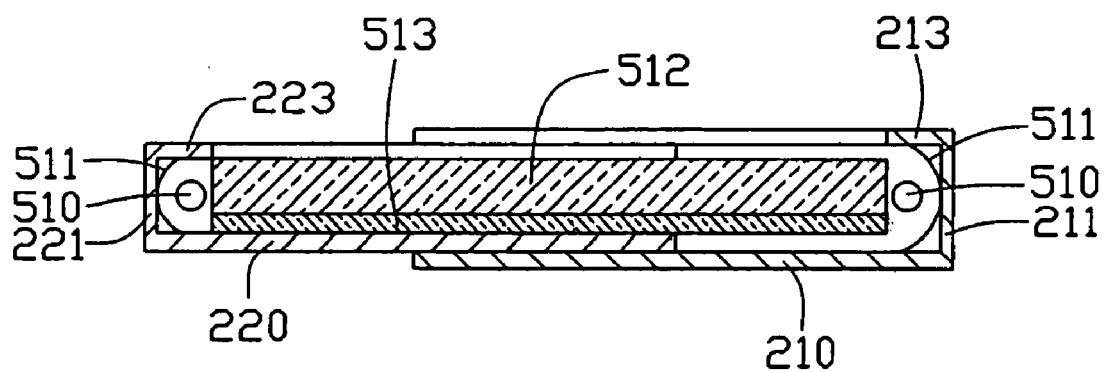
FIG. 6 is a side plane view of the backlight module in FIG. 5.
Figure 7:
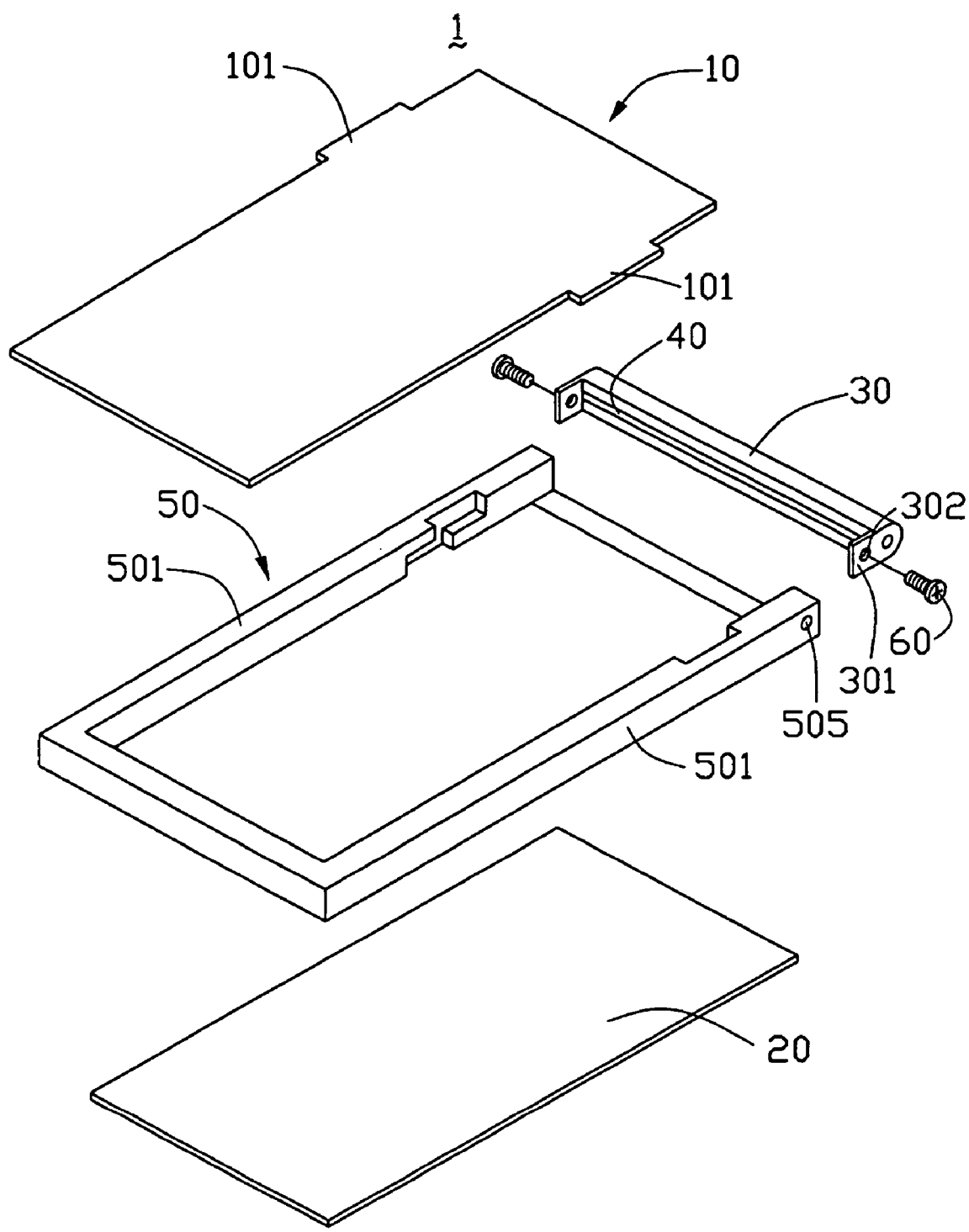
FIG. 7 is an exploded view of a conventional backlight module.
Figure 8:
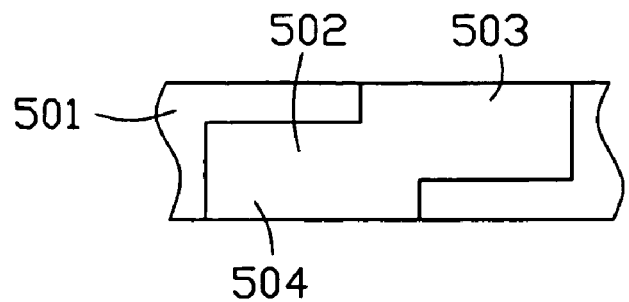
FIGS. 8 to 10 are partially assembly schematic views of the backlight module in FIG. 7.
Figure 9:
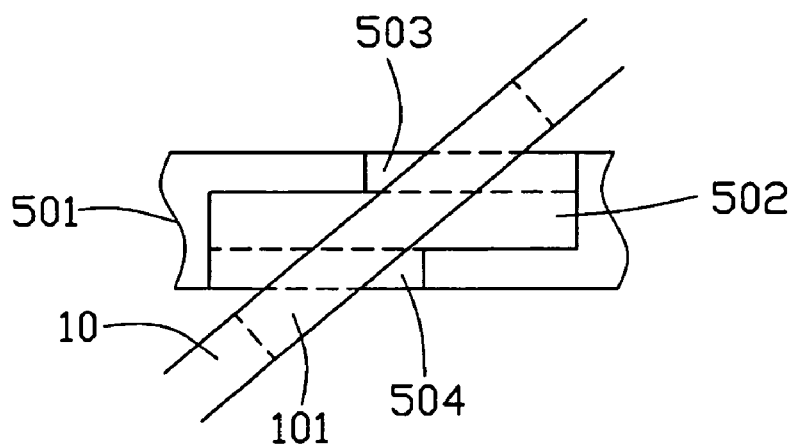
Figure 10:
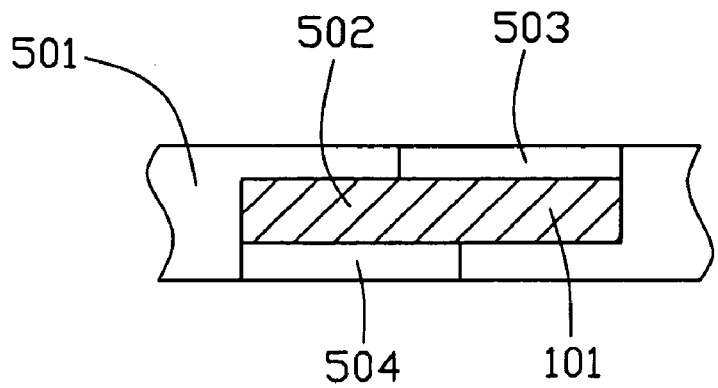

FIGS. 5 and 6 are views illustrating a backlight module according to the present invention. The backlight module 5 includes light sources 510, light source covers 511, a light guide plate 512, a reflective plate 513 and the above-mentioned frame 2. The light sources 510 are fluorescent tubes, which also can be light-emitting diodes. Each of the light source covers 511 partially surrounds the corresponding light source 510. The two combinations of the light source 510 and the light cover 511 are respectively disposed in a space defined by the bottom plate 210, the sidewalls 211, and the flanges 213. One light source 510 and one light source cover 511 may be used in the embodiment, otherwise.

A process for assembling the backlight module 5 includes the following steps: inputting the two combinations of the light source 510 and the light cover 511 into the corresponding space defined by the bottom plate 210, the sidewalls 211, and the flanges 213, respectively; stacking the reflective plate 513, the light guide plate 512 on the bottom plate 220 of the movable case 22 in order; inserting the movable case 22 into the stable case 21, and adjusting the light sources 510, the light source covers 511, the stable case 21 and the movable case 22 to make the assembly compact.

The backlight module 5 further includes a diffusing plate, at least one brightness enhancing film and a reflective type polarizer disposed on the light guide plate 512 in order. A plurality of position holes (not shown) can be formed on the sidewalls 211, and the stable case 21 and the movable case 22 are fixed by the cooperation of the position holes and screws (not shown) after the assembly.

Further, it is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A frame for a backlight module, comprising:
    a stable case comprising a bottom plate, at least three sidewalls connected to the bottom plate;
    a movable case comprising a back rim and two side rims connected to thereto;
    wherein the movable case is slideably connected with the stable case by connecting elements to together form an adjustable receiving access configured for holding the backlight module.

2. The frame according to claim 1, wherein the connecting elements are two runners defined by the bottom plate, the at least three sidewalls, and flanges projecting from the corresponding sidewalls and parallel to the bottom plate.

3. The frame according to claim 2, wherein the movable case further comprises a bottom plate connected to the back rim and the side rims.

4. The frame according to claim 3, wherein free ends of the side rims are bent towards inside of the movable case to form curve portions.

5. The frame according to claim 1, wherein the at least three sidewalls are three outside walls and two inside walls, and the connecting elements are sliding slots defined by the two inside walls and two outside walls.

6. The frame according to claim 1, wherein free ends of the side rims are bent towards the outside of the movable case to form curve portions, and the connecting elements are sliding slots defined by the two side rims and the curve portions.

7. The frame according to claim 1, wherein free ends of the side rims are bent in the same direction to define curve portions, and the connecting elements are sliding slots defined by the two side rims and the curve portions.

8. A backlight module, comprising:
    a light guide plate;
    a light source disposed adjacent to the light guide plate; and
    a frame with an adjustable receiving access configured for receiving the light guide plate and the light source, comprising:
        a stable case comprising a bottom plate and at least three sidewalls connected to the bottom plate;
        a movable case comprising a back rim and two side rims connected to thereto;
        wherein the movable case is slideably connected with the stable case by connecting elements to together form the adjustable receiving access.

9. The backlight module according to claim 8, wherein the connecting elements are two runners defined by the bottom plate, the at least three sidewalls, and flanges projecting from the corresponding sidewalls and parallel to the bottom plate.

10. The backlight module according to claim 9, wherein the movable case further comprises a bottom plate connected to the back rim and the side rims.

11. The backlight module according to claim 10, wherein free ends of the side rims are bent towards inside of the movable case to form curve portions.

12. The backlight module according to claim 8, wherein the at least three sidewalls are three outside walls and two inside walls, and the connecting elements are sliding slots defined by the two inside walls and two outside walls.

13. The backlight module according to claim 8, wherein free ends of the side rims are bent towards the outside of the movable case to form curve portions, and the connecting elements are sliding slots defined by the two side rims and the curve portions.

14. The backlight module according to claim 8, wherein free ends of the side rims are bent in the same direction to define curve portions, and the connecting elements are sliding slots defined by the two side rims and the curve portions.

15. The backlight module according to claim 8, wherein the backlight module further comprises a reflective plate disposed below the light guide plate.

16. The backlight module according to claim 15, wherein the backlight module further comprises a diffusing plate, at least one brightness enhancing film and a reflective type polarizer disposed on the light guide plate in order.

17. A frame used in a backlight module, comprising:
   two separated cases; and
   a connecting element comprising sliding parts and receiving slots respectively formed in the two separated cases, wherein the two separated cases are slideably connected by the connecting element to form an adjustable receiving access to hold the backlight module.

* * * * *